US008459619B2

(12) United States Patent
Trinh et al.

(10) Patent No.: US 8,459,619 B2
(45) Date of Patent: Jun. 11, 2013

(54) GAS SPRING CONTROL SYSTEM AND METHOD

(75) Inventors: Minh Trinh, Neenah, WI (US); David P. Cuff, Oshkosh, WI (US); Rongjun Zhang, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 238 days.

(21) Appl. No.: 12/910,834

(22) Filed: Oct. 24, 2010

(65) Prior Publication Data

US 2012/0098172 A1 Apr. 26, 2012

(51) Int. Cl.
*F16F 9/08* (2006.01)

(52) U.S. Cl.
USPC .................................. 267/64.23; 267/64.28

(58) Field of Classification Search
USPC .......... 267/64.11, 64.15, 64.19, 64.21, 64.23, 267/64.24, 64.27, 64.28, 122; 280/124.1, 280/124.157, 124.16, 124.161; 701/37
See application file for complete search history.

(56) References Cited

U.S. PATENT DOCUMENTS

| | | | |
|---|---|---|---|
| 4,993,729 A | 2/1991 | Payne | |
| 5,521,817 A | 5/1996 | Burdoin et al. | |
| 5,680,122 A | 10/1997 | Mio | |
| 5,781,119 A | 7/1998 | Yamashita et al. | |
| 6,151,539 A | 11/2000 | Bergholz et al. | |
| 6,173,222 B1 | 1/2001 | Seo et al. | |
| RE37,610 E | 3/2002 | Tsuchiya et al. | |
| 6,480,769 B1 | 11/2002 | Kageyama | |
| 6,593,960 B1 | 7/2003 | Sugimoto et al. | |
| 6,678,394 B1 | 1/2004 | Nichani | |
| 6,874,772 B2 * | 4/2005 | Oldenettel | ............... 280/124.16 |
| 6,902,630 B2 | 6/2005 | Ernst et al. | |
| 6,983,324 B1 | 1/2006 | Block et al. | |
| 7,243,026 B2 | 7/2007 | Kudo | |
| 7,248,283 B2 | 7/2007 | Takagi et al. | |
| 2002/0161489 A1 | 10/2002 | Johnson | |
| 2003/0107191 A1 | 6/2003 | Romer et al. | |
| 2003/0208309 A1 | 11/2003 | Triphathi | |
| 2004/0030451 A1 | 2/2004 | Solomon | |
| 2004/0167709 A1 | 8/2004 | Smitherman et al. | |
| 2005/0004723 A1 | 1/2005 | Duggan et al. | |

(Continued)

FOREIGN PATENT DOCUMENTS

| | | |
|---|---|---|
| DE | 198 46 664 A1 | 4/1999 |
| EP | 1 504 929 | 2/2005 |

(Continued)

OTHER PUBLICATIONS

International Search Report and Written Opinion for Application No. PCT/US2007/071473, mailing date Jun. 27, 2008, 11 pages.

(Continued)

*Primary Examiner* — Thomas J Williams
(74) *Attorney, Agent, or Firm* — Foley & Lardner LLP (57) ABSTRACT

A vehicle suspension system includes a pump, a gas spring, and an accumulator. The suspension system also includes a controller for adjusting the suspension system. The controller has a processing circuit configured to receive a measure of gas in the spring. The processing circuit is further configured to calculate a difference between a target value and a current value based on the received measure of gas. The processing circuit is also configured to provide an output for adjusting the gas in the spring in response to the calculated difference.

15 Claims, 9 Drawing Sheets

U.S. PATENT DOCUMENTS

| | | | |
|---|---|---|---|
| 2005/0021197 | A1 | 1/2005 | Zimmerman et al. |
| 2005/0021199 | A1 | 1/2005 | Zimmerman et al. |
| 2005/0035562 | A1 | 2/2005 | Meier et al. |
| 2005/0197749 | A1 | 9/2005 | Nichols et al. |
| 2006/0018513 | A1 | 1/2006 | Sogawa |
| 2006/0020380 | A1 | 1/2006 | Saito et al. |
| 2006/0114324 | A1 | 6/2006 | Farmer et al. |
| 2006/0129292 | A1 | 6/2006 | Ohkubo |
| 2006/0171704 | A1 | 8/2006 | Bingle et al. |
| 2007/0228676 | A1* | 10/2007 | Stegmann ............... 280/5.514 |
| 2007/0299794 | A1 | 12/2007 | El-Damhougy |
| 2007/0299947 | A1 | 12/2007 | El-Damhougy |
| 2008/0189009 | A1 | 8/2008 | Wang et al. |
| 2008/0195277 | A1 | 8/2008 | Stiller |
| 2010/0253017 | A1* | 10/2010 | Vanraaphorst ............ 280/5.504 |
| 2010/0268409 | A1 | 10/2010 | Vian et al. |
| 2011/0093166 | A1* | 4/2011 | Li et al. ......................... 701/40 |

FOREIGN PATENT DOCUMENTS

| | | |
|---|---|---|
| EP | 1 844 961 | 10/2007 |
| JP | 11212641 | 8/1999 |
| JP | 2002196817 | 7/2002 |

OTHER PUBLICATIONS

International Search Report and Written Opinion for International Application No. PCT/US2009/043980, mail date Dec. 29, 2009, 10 pages.

US Office Action for U.S. Appl. No. 11/562,824, dated May 6, 2011, 10 pages.

US Office Action for U.S. Appl. No. 12/122,355, dated Oct. 25, 2011, 26 pages.

Williamson et al., "A Trinocular Stereo System for Highway Obstacle Detection," Robotics and Automation, Proceedings, 1999 IEEE International Conference, Detroit, Michigan, May 10-15, 1999, pp. 2267-2273.

Invitation to Pay Additional Fees and Partial International Search Report for Application No. PCT/US2011/056697, mail date Jan. 26, 2012, 6 pages.

Office Action for U.S. Appl. No. 12/122,355, mail date Oct. 25, 2011, 27 pages.

Office Action for U.S. Appl. No. 12/122,355, mail date Feb. 21, 2012, 20 pages.

Written Opinion for International Application No. PCT/US2011/056697, mail date Jun. 8, 2012, 10 pages.

* cited by examiner

GAS SPRING CONTROL SYSTEM AND METHOD

BACKGROUND

The present application relates to suspension systems for vehicles. More specifically, the present application relates to a control system for a gas spring in a vehicle suspension system.

SUMMARY

One embodiment of the present invention relates to a controller for adjusting the suspension system for a vehicle, the suspension system having one or more gas springs. The controller includes a processing circuit configured to receive a measure of gas in the one or more springs. The processing circuit is further configured to calculate a difference between a target value and a current value based on the received measure of gas. The processing circuit is also configured to provide an output for adjusting the gas in the one or more springs in response to the calculated difference.

Another embodiment of the present invention relates to a method for adjusting the suspension system of a vehicle. The method includes receiving at a processing circuit a measured pressure value from a pressure sensors in a gas spring assembly. The method also includes determining in a memory a difference value using the measured pressure value and a target pressure value. The method further includes adjusting the gas spring assembly to reduce the difference value.

Yet another embodiment of the present invention relates to a vehicle suspension system. The suspension system includes a gas spring. The suspension system also includes a spring pressure sensor configured to measure the pressure in the gas spring. The suspension system further includes a spring length sensor configured to determine a length of the gas spring. The suspension system yet further includes a processing circuit configured to receive a current spring pressure value from the spring pressure sensor and to receive a current spring length value from the spring length sensor. The processing circuit is also configured to calculate a current volume value using the spring length sensor, to determine the product of the current volume value and the current spring pressure value, and to calculate a difference value using a target value and the product. The processing circuit is further configured to provide an output for adjusting the amount of gas in the spring in response to the calculated difference.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
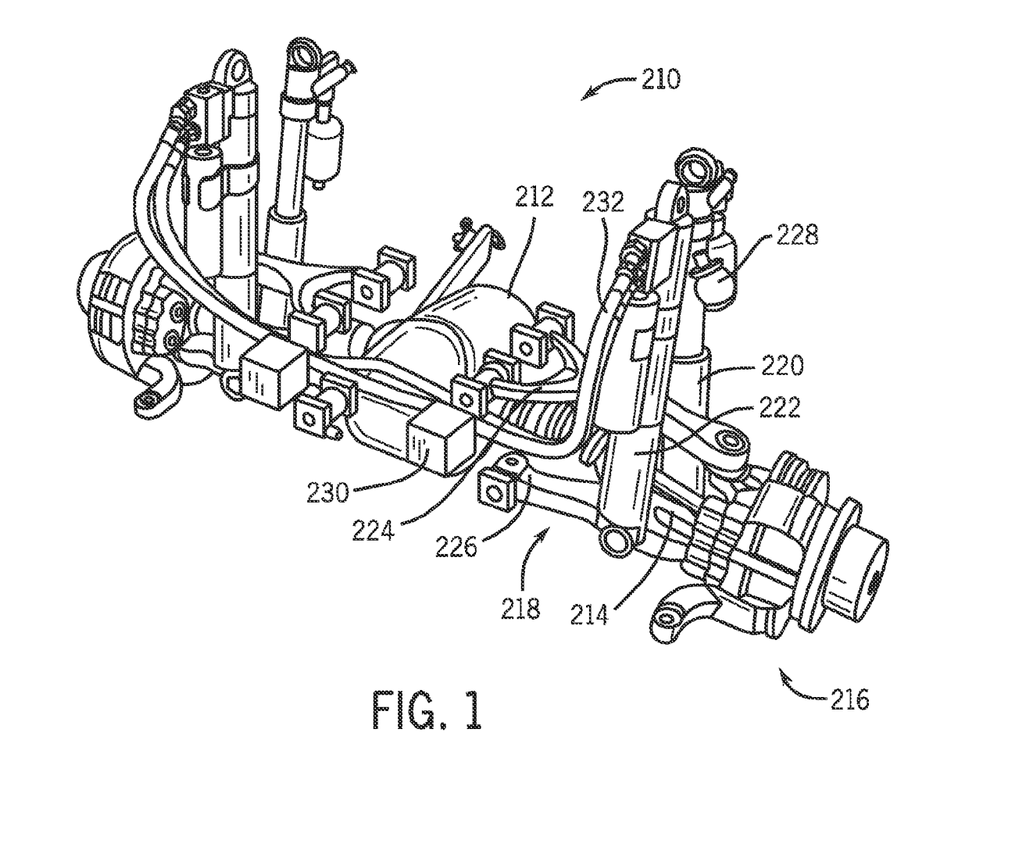
FIG. 1 is a perspective view of an axle assembly, according to an exemplary embodiment of the invention.

According to an embodiment, a vehicle may include a body supported by a suspension system (see, e.g., suspension system 218 as shown in FIG. 1). In some embodiments, the vehicle may be a military vehicle. In other embodiments, the vehicle may be a utility vehicle, such as a fire truck, a tractor, construction equipment, or a sport utility vehicle. The vehicle may be configured for operation on both paved and rough, off-road terrain. As such, the suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

Referring to FIG. 1, an axle assembly 210 is configured for use with the vehicle. According to an exemplary embodiment, the axle assembly 210 includes a differential 212 connected to half shafts 214, which are each connected to a wheel end assembly 216. The wheel end assembly 216 is at least partially controlled (e.g., supported) by a suspension system 218, which includes a spring 220, a damper 222, an upper support arm 224, and a lower support arm 226 coupling the wheel end assembly 216 to the vehicle body or part thereof (e.g., chassis, side plate, hull).

According to an exemplary embodiment, the differential 212 is configured to be connected with a drive shaft of the vehicle, receiving rotational energy from a prime mover of the vehicle, such as a diesel engine. The differential 212 allocates torque provided by the prime mover between half shafts 214 of the axle assembly 210. The half shafts 214 deliver the rotational energy to the wheel-end assemblies 216 of the axle assembly 210. The wheel end assemblies 216 may include brakes, gear reductions, steering components, wheel hubs, wheels, and other features. As the vehicle travels over uneven terrain, the upper and lower support arms 224, 226 at least partially guide the movement of each wheel end assembly 216, and a stopper 228 provides an upper bound to movement of the wheel end assembly 216.

Figure 2:
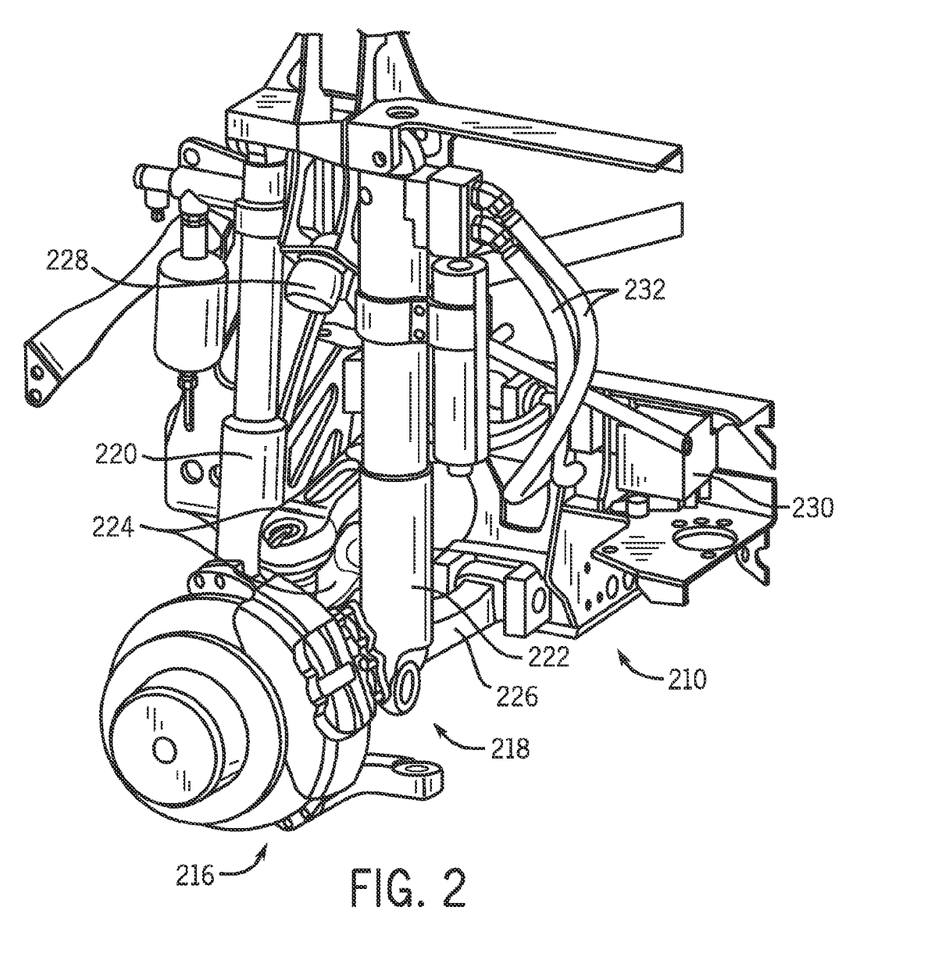
FIG. 2 is a perspective view of a suspension system, according to an exemplary embodiment of the invention.

Referring to FIG. 2, according to an exemplary embodiment the suspension system 218 includes one or more high-pressure gas components, where the spring 220 is a high-pressure gas spring 220. In some embodiments, the suspension system further includes at least one high-pressure gas pump 230. In some such embodiments, the suspension system 218 includes separate high-pressure gas pumps 230 associated with each spring 220 and damper 222 set. In preferred embodiments, the gas of the pump 230, spring 220, and damper 222 includes (e.g., is at least 90%, at least 95%) an inert gas such as nitrogen, argon, helium, etc., which may be stored, provided, or received in one or more reservoirs (e.g., central reservoir, tank) (not shown).

During operation, the pump 230 selectively provides gas, under pressure, to the high-pressure gas spring 220 and/or to reservoirs, tanks, accumulators, or other devices. In some contemplated embodiments, two or more high-pressure gas dampers 222 of the vehicle are cross-plumbed via lines 232 (e.g., hydraulic lines) connecting dampers 222 on opposite sides of the axle assembly 210, between dampers 222 in a "walking beam" configuration for a tandem axle, or between dampers 222 on separate axle assemblies of the vehicle (e.g., between dampers located front-to-back, or diagonally located with respect to each other).

Figure 3:
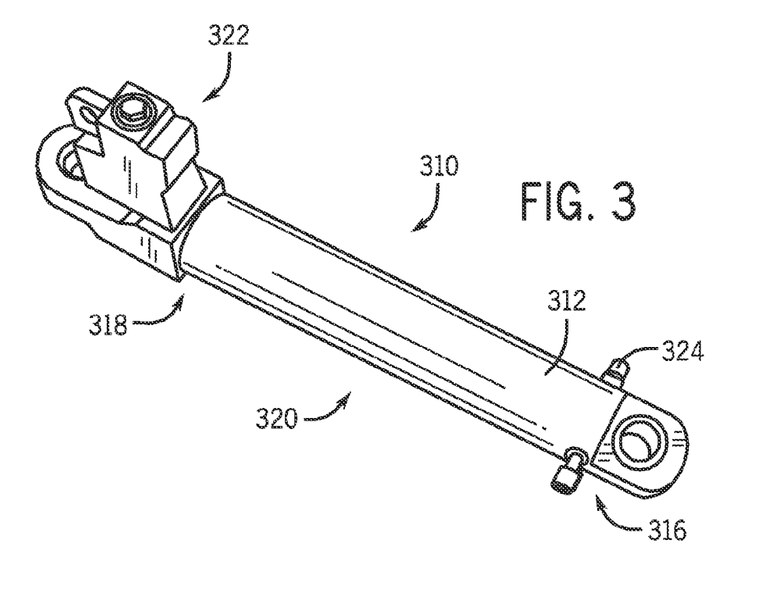
FIG. 3 is a perspective view of a gas spring in a first configuration, according to an exemplary embodiment.
Figure 4:
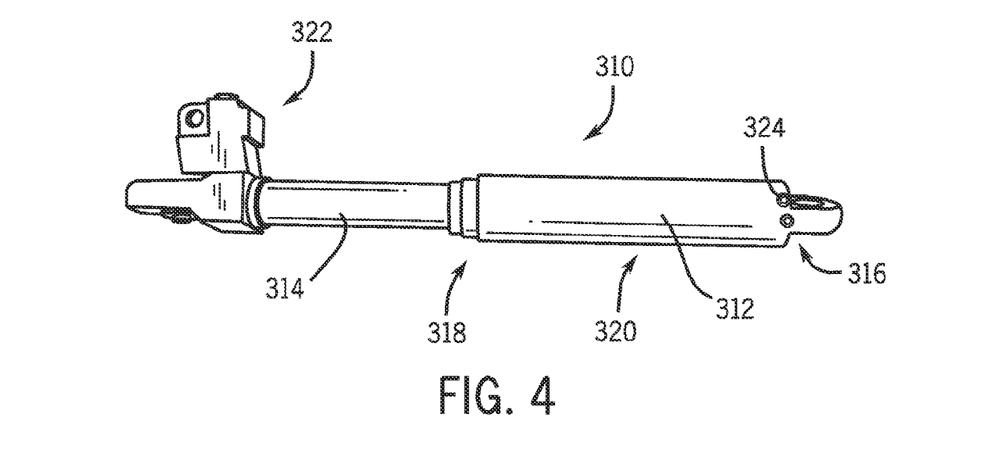
FIG. 4 is a side view of the gas spring of FIG. 3 in a second configuration, according to an exemplary embodiment;.
Figure 7:
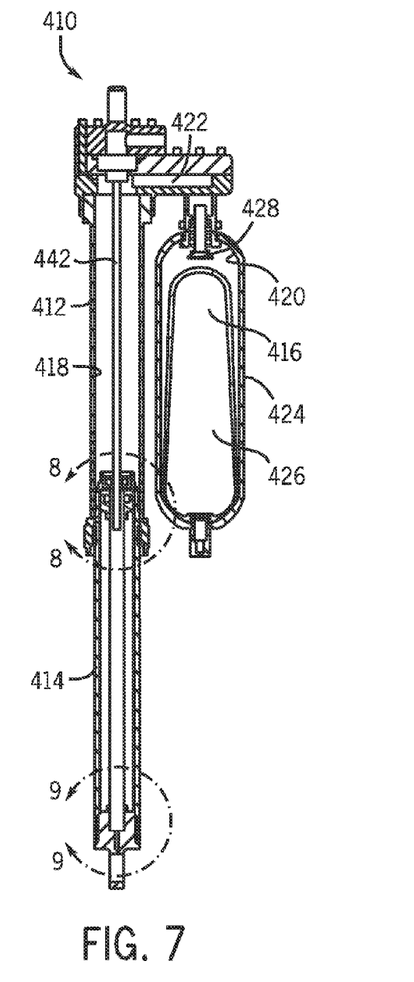
FIG. 7 is a sectional view of the gas spring assembly of FIG. 6, taken along line 7-7 of FIG. 7; according to an exemplary embodiment.

Referring to FIGS. 3-4, a gas spring 310 includes a cylinder 312 coupled to a rod 314 (FIG. 4). The cylinder 312 has a cap end 316, a rod end 318, and a side wall 320 (e.g., cylindrical side wall) extending between the cap and rod ends 316, 318. A chamber (see, e.g., chamber 418 as shown in FIG. 7) is formed between the cylinder 312 and the rod 314—such as interior to the cylinder 312, between the cap end 316, the side wall 320, and the rod 314, which extends through the rod end 318 of the cylinder 312. Nitrogen or another gas held in the chamber compresses or expands in response to relative movement between the rod 314 and the cylinder 312 to provide the receipt, storage, or release of potential energy by the gas spring 310.

The rod 314 is configured to translate with respect to the cylinder 312. According to an exemplary embodiment, the rod 314 is coupled to or comprises a piston (see, e.g., rod 414 as shown in FIG. 7; e.g., rod end, plunger) that forms a wall of the chamber. When the rod 314 translates relative to the cylinder 312, the piston changes the volume of the chamber, compressing the gas in the chamber or allowing the gas to expand. The gas in the chamber resists compression, providing a force that is a function of the compressibility of the gas, the area of the piston, the volume and geometry of the chamber, and the current state (e.g., initial pressure) of the gas, among other factors. As such, the gas spring 310 receives potential energy, stored in the gas, as the gas is compressed and releases the potential energy as the gas expands.

The cylinder 312 of the gas spring 310 is preferably cylindrical due to structural benefits associated with cylindrical pressure vessels. However, in other contemplated embodiments, the cylinder 312 may be substituted for a body having another geometry. In some contemplated embodiments, the chamber may be formed in, or at least partially formed in the rod 314. In one such embodiment, the chamber spans both the cylinder 312 and at least a portion of the interior of the rod 314.

Figures 5, 6:
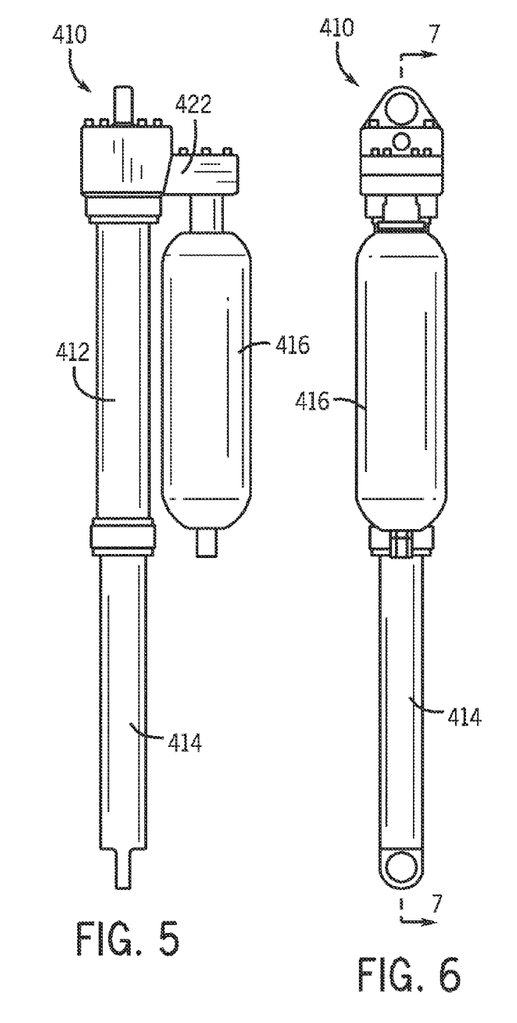
FIG. 5 is a side view of a gas spring assembly, according to an exemplary embodiment of the invention.
FIG. 6 is a front view of the gas spring assembly of FIG. 5, according to an exemplary embodiment.

In some embodiments, the gas spring 310 includes at least one port 322 (e.g., aperture, inlet) that may be opened to allow gas (e.g., inert gas) to be provided to or from the chamber. The chamber of the gas spring is substantially sealed when the port 322 is not open. In some embodiments, the port 322 may be coupled to an accumulator (see, e.g., accumulator 416 as shown in FIG. 5), to a pump (see, e.g., pump 230 as shown in FIG. 2), or to one or more reservoirs (not shown). In some embodiments, the spring 310 includes separate ports associated with the accumulator and the pump.

In some embodiments, the gas spring 310 further includes at least one port 324 that may be opened to allow a pressurized reservoir of a higher or a lower pressure (see generally accumulator 416 as shown in FIG. 5) to be coupled to the gas spring 310. Coupling the higher pressure reservoir to the gas spring 310 increases the pressure in the gas spring 310, causing the gas spring 310 to expand and increasing the ride height of the axle assembly. Conversely, coupling the lower pressure reservoir to the gas spring 310 decreases the pressure in the gas spring 310, causing the gas spring 310 to contract and decreasing the ride height of the axle assembly. In some embodiments, the spring 310 includes separate ports 324 for providing hydraulic fluid to the internal volume and for receiving hydraulic fluid from the internal volume.

Figure 8:
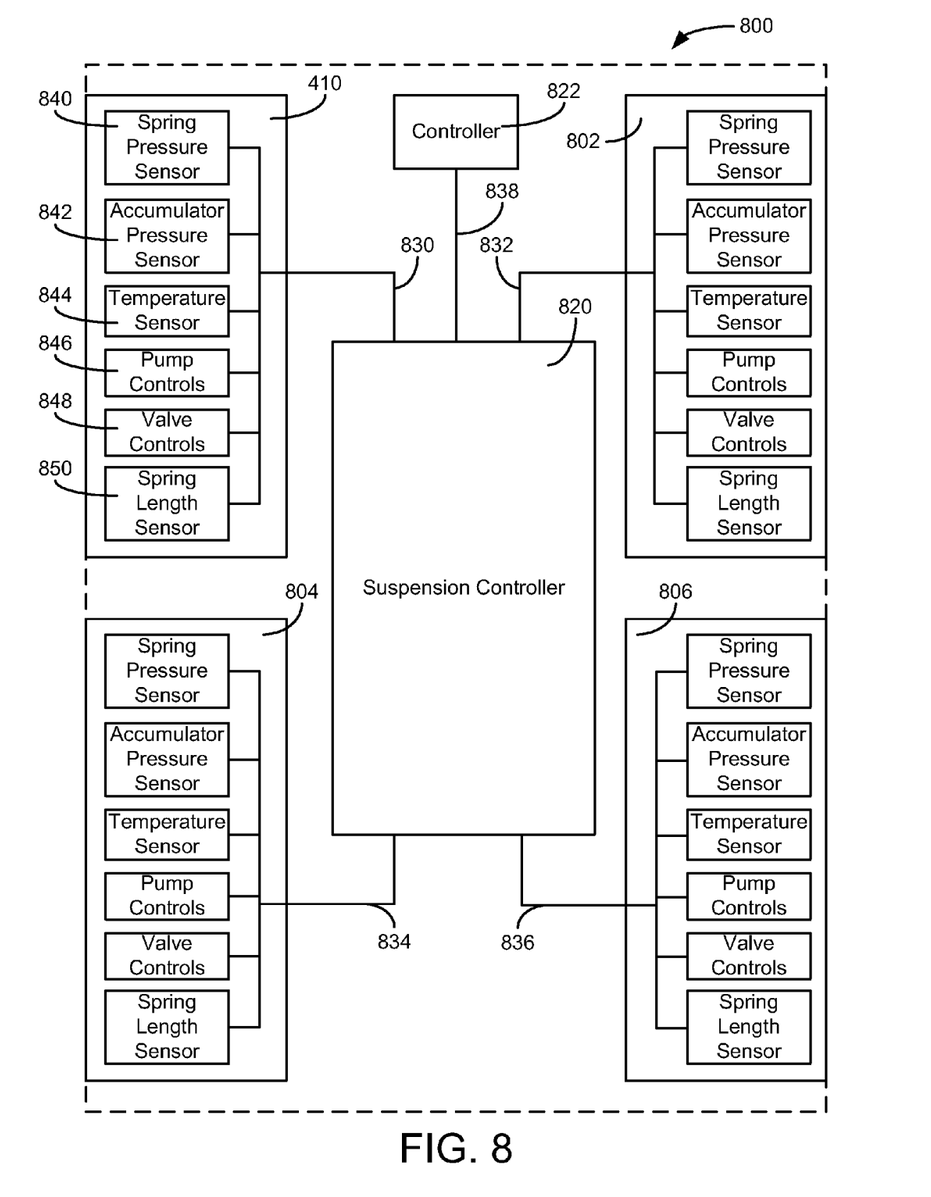
FIG. 8 is a detailed diagram of a vehicle suspension control system, according to an exemplary embodiment.

In other contemplated embodiments, the gas spring 310 is coupled directly to a pump (see, e.g., pump 230 as shown in FIG. 2), to increase or decrease pressure in the gas spring 310 corresponding to a desired ride height. In still another contemplated embodiment, a gas spring further includes at least one port that may be opened to allow hydraulic fluid (e.g., oil) to be provided to or from an internal volume (see, e.g., internal volume 432 as shown in FIG. 8) of the gas spring. The internal volume for hydraulic fluid is separated from the chamber for gas. In such contemplated embodiments, adding or removing of hydraulic fluid from the internal volume changes the overall length of the gas spring for different ride heights of the suspension system. However using pressurized gas to change the length of the gas spring 310 may be preferable in some embodiments because of reduced losses (e.g., friction, drag) associated with a flow of gas (e.g., nitrogen) compared to hydraulic fluid (e.g., oil).

Referring now to FIGS. 5-7, a gas spring assembly 410 includes a cylinder 412 coupled to a rod 414, and an accumulator 416. A first chamber 418 (FIG. 7) is formed between the cylinder 412 and the rod 414 and a second chamber 420 is formed in the accumulator 416. According to an exemplary embodiment, the accumulator 416 includes a rigid exterior 424 (e.g., shell, housing) and a flexible, inflatable bladder 426 within the rigid exterior 424. The second chamber 420 is located between the rigid exterior 424 and the bladder 426. According to an exemplary embodiment, the accumulator 416 is positioned proximate to the cylinder 412 and rod 414, and the second chamber 420 of the accumulator 416 is connected to the first chamber 418, formed between the cylinder 412 and rod 414, by way of a gas transfer conduit 422. The gas transfer conduit 422 may include a valve 428 (e.g., check valve, poppet) for controlling access between the first and second chambers 418, 420. The valve 428 may serve to optionally disconnect the accumulator 416 from the first chamber 418, or to optionally contain gas in the second chamber 420 having a pressure exceeding or lower than gas in the first chamber 418.

In some embodiments, when the valve 428 is open, the first chamber 418 is in gaseous communication with the second chamber 420 such that a continuous body of gas extends between the two chambers 418, 420. No intermediate hydraulic fluid or mechanical element is included to transfer energy from the first chamber 418 to the second chamber 420 or vice versa. In some such embodiments, the only hydraulic fluid associated with the gas spring assembly 410 is a thin film between the rod and cylinder that moves during compression or extension of the rod 414. Use of the continuous body of gas for gaseous communication between the first and second chambers 418, 420 is intended to reduce frictional losses associated with energy transfer between the first and second chambers 418, 420, as may otherwise occur with hydraulic or mechanical intermediate elements. However, in other contemplated embodiments, hydraulic or mechanical intermediate elements may be used.

During use of the gas spring assembly 410, in some embodiments, the bladder 426 is inflated to an initial pressure. As the rod 414 and cylinder 412 are moved together, such as when the associated vehicle drives over a bump, gas in the chamber 418 compresses, providing a first spring rate for the gas spring assembly 410. In such embodiments, the pressure of the gas in the first chamber 418 is communicated to the accumulator 416 via the transfer conduit 422. If the pressure of the gas communicated from the first chamber 418 is below the initial pressure of the bladder 426, the gas spring assembly 410 will respond to the bump with the first spring rate. However, if the pressure of the gas communicated from the first chamber 418 exceeds the initial pressure in the bladder 426, then the bladder 426 will compress, increasing the effective volume of the second chamber 418, which provides a second spring rate to the gas spring assembly 410.

In some such embodiments, a pump (see, e.g., pump 230 as shown in FIG. 2) may be coupled to the bladder 426 to increase the initial pressure of the bladder 426 and thereby increase the threshold amount of loading required to achieve compression of the bladder 426, which would increase the loading required to initiate the second spring rate. Or gas may be released from the bladder 426 to decrease the threshold. As such, the value of the initial pressure of the bladder 426 may be set to achieve a desired responsiveness of the gas spring assembly 410. Use of the first and second spring rates is intended to reduce peak forces on the vehicle, improving the ride quality and durability of the vehicle. Tuning of the threshold allows for adjustment of the response of the gas spring assembly 410 depending upon a particular vehicle application.

According to an exemplary embodiment, the gas spring assembly further includes a sensor 442 integrated with the gas spring assembly 410 and configured to sense the relative configuration of the rod 414 and cylinder 412. In some embodiments, the sensor 442 provides a signal (e.g., digital output) that is indicative of the ride height of the associated suspension system (see, e.g., suspension system 218 as shown in FIG. 1) based upon the relative configuration of the rod 414 and cylinder 412. In contemplated embodiments, the sensor 442 includes a linear variable differential transformer (LVDT), where a shaft of the LVDT extends through the cylinder 412 to the rod 414. As the rod 414 and cylinder 412 move relative to one another, the shaft of the LVDT provides a signal (e.g., inductive current) that is a function of the movement of the shaft.

Referring now to FIG. 8, a detailed diagram of a vehicle suspension control system is shown, according to an exemplary embodiment. Vehicle 800 is shown to include gas spring assemblies 410, 802, 804, and 806. Suspension controller 820 communicates with spring assemblies 410, 802, 804 and 806 via data lines 830, 832, 834, and 836, respectively. Suspension controller 820 also communicates with engine control unit 822 (controller) via data line 838. Data lines 830, 832, 834, 836, and 838 may be any type of communications medium capable of conveying electronic data between suspension controller 820 and spring assemblies 410, 802, 804, 806, and controller 822. Data lines 830, 832, 834, 836, 838 may be wired connections, wireless connections, or a combination of wired and wireless connections. In some embodiments, data lines 830, 832, 834, 836, 838 are redundant connections. For example, data line 830 may comprise two or more independent connections between suspension controller 820 and spring assembly 410. In another example, data line 830 may comprise individual connections between suspension controller 820 and the sensors and controls of spring assembly 410 (e.g., spring pressure sensor 840, valve controls 848, etc.).

Spring assemblies 410, 802, 804, 806 each comprise sensor and control equipment coupled to data lines 830, 832, 834, 836. For example, spring assembly 410 may have a spring pressure sensor 840, accumulator pressure sensor 842, temperature sensor 844, pump controls 846, valve controls 848, and spring length sensor 850. Pump controls 846 control the operation of one or more pumps that provide pressurized gas to or from a gas spring and/or an accumulator in spring assembly 410. Valve controls 848 control one or more valves that regulate gas flow between the one or more pumps, the gas spring and the accumulator. Spring pressure sensor 840 measures the pressure in the gas spring of spring assembly 410 and provides the measured data to suspension controller 820 via data line 830. Accumulator pressure sensor 842 measures the pressure in the accumulator of spring assembly 410 and provides the measured data to suspension controller 820 via data line 830. Optionally, spring assembly 410 may also include temperature sensor 844 within the accumulator of spring assembly 410. Spring length sensor 850 measures the current length of the gas spring in spring assembly 410. In other embodiments, spring assemblies 410, 802, 804, 806 may comprise any number of sensors and controls. For example, accumulator pressure sensor 842 may comprise two or more pressure sensors to provide redundancy for the suspension system in vehicle 800.

Suspension controller 820 is also shown to communicate with controller 822 via data line 838. Controller 822 may be one or more microprocessors that control non-suspension functions of vehicle 800. For example, controller 822 may control the timing of the engine in vehicle 800, the electrical power sent to various lights in vehicle 800, etc. or control any other non-suspension related electronic functions of vehicle 800. In some embodiments, controller 822 is separate from suspension controller 820 and communicates with suspension controller 820 via data line 838. In other embodiments, suspension controller 820 may be part of controller 822.

Controller 822 may also comprise circuitry that provides an interface for a user. For example, controller 822 may communicate with a handheld computing device operated by a user to provide information to the display of the handheld device and to receive user input data from the handheld device. In other embodiments, controller 822 may communicate with a user interface that comprises one or more interactive devices (e.g., a touch-screen display, a keyboard, a mouse, voice-activated controls, etc.) and non-interactive devices (e.g., a monitor, a speaker, etc.) located within vehicle 800. Controller 822 provides the user interactive data to suspension controller 820 via data line 838 and receives data from suspension controller 820 to be presented to a user. For example, a user may provide a preferred vehicle height to suspension controller 820 via controller 822 or view the current pressure for a given spring using data provided by suspension controller 820 to a user display via controller 822.

Figure 9:
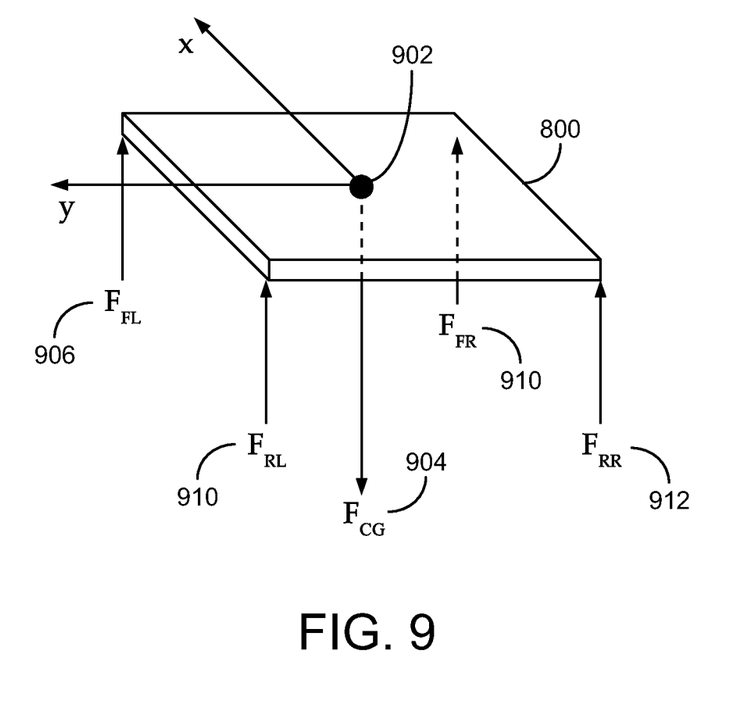
FIG. 9 is a force diagram of a vehicle, according to an exemplary embodiment.

Referring now to FIG. 9, a force diagram of the vehicle suspension system of vehicle 800 is shown, according to an exemplary embodiment. The wheels of vehicle 800 experience resistance forces $F_{FL}$ 906, $F_{FR}$ 908, $F_{RL}$ 910, and $F_{RR}$ 912 from the ground, which correspond to the front left, front right, rear left, and rear right tires, respectively. Vehicle 800 is also shown to have a center of mass (e.g., center of gravity) 902 which also provides downward force $F_{CG}$ 904.

Control of the suspension system of vehicle 800 can be achieved by calculating a target quantity of gas for each spring and controlling the valves and/or pumps in each spring assembly to achieve the target quantity. Suspension controller 820 can calculate the target quantity of gas using a mass estimate for vehicle 800 and a spring gas volume target at ride height. Here, ride height corresponds to a level or mostly level position for vehicle 800. For example, each spring assembly of vehicle 800 may provide equal spring lengths when vehicle 800 is at rest on a flat surface. In real world operation, adjustment of the suspension of vehicle 800 may not provide an entirely level position due to various environmental conditions (e.g., uneven terrain, friction, etc.). However, the effects of these environmental conditions may be mitigated using the isothermal gas law: PV=c where P is the spring pressure, V is the spring volume, and c is a constant. In particular, c=nRT, where n is the amount of gas, R is the universal gas constant approximately equal to 8.314 J/(K*mol), and T is the measured temperature in Kelvin. The value of n may be estimated using data from pressure sensors, temperature sensors, volume sensors, or any other sensor in the suspension system of vehicle 800. In one embodiment, n is calculated using data from flow rate sensors without using data from pressure sensors. In other embodiments, n may be estimated using data from pressure sensors.

Suspension controller 820 can control the suspension system of vehicle 800 by minimizing an error estimation calculated as error=$[P*V]_{current}-P_{target}*V_{target}$, where P and V are the current spring pressure and volume and $P_{target}$ and $V_{target}$ are target pressure and volume. $V_{target}$ corresponds to the spring volume at ride height while $P_{target}$ target may be calculated using a mass estimation for vehicle 800. Suspension controller 820 can compensate for variations in the spring volume when the spring length differs from ride height (e.g., the spring is compressed or extended due to environmental conditions), by changing the spring pressure. Although the term "minimizing" is used with respect to the error calculation throughout the present specification, it is to be understood that the error calculation is exemplary only and that suspension controller 820 may perform any number of calculations to reduce the difference between the $[P*V]_{current}$ value and the product $P_{target}*V_{target}$ value. In other embodiments, suspension controller 820 may use other control methods may use adaptive control, robust control, control methods that do not require the calculation of the actual mass, or any other control method.

Suspension controller 820 can calculate $P_{target}$ using a mass estimation for vehicle 800. A number of assumptions can be made to simplify the calculation of the mass estimation by suspension controller 820. For example, a linear relationship can be assumed between spring pressures and tire contact forces. Certain geometric relationships in vehicle 800 can also be assumed to be uniform (e.g., front and rear track widths are identical, each suspension corner is identical in dimensions, etc.). Another assumption that can be made is that the vehicle spring mass is only supported by gas pressure. This assumption does not hold true when the spring is at a travel range limit (e.g., the spring is fully compressed or fully extended). In such a case, suspension controller 820 may adjust the spring away from the travel range limit so that the mass estimation can be calculated. In some embodiments, the adjustment away from the travel range limit is done without regard to a particular target spring length, since the mass estimation can be calculated at any spring length that is not at a travel range limit. For example, the suspension may be lowered until it is no longer hitting rebound stops or raised until it is no longer hitting jounce bumpers. One skilled in the art would appreciate that any calculations presented herein can be modified accordingly to account for variations from these assumptions.

Three primary equations govern the suspension of vehicle 800 and can be calculated by suspension controller 820. First, the vertical forces must be equal, i.e., $\Sigma F_z=0$, where $F_z$ denotes forces 904, 906, 908, 910 and 912. Second, the x-axis moments must be equal, i.e., $\Sigma M_x=0$, where $M_x$ are the corresponding moments about the x-axis. Third, the y-axis moments must be equal, i.e., $\Sigma M_y=0$, where $M_y$ are the corresponding moments about the y-axis. In a normal scenario, vehicle 800 has four contact points with the surface of the ground, leading to a degree of freedom in the spring pressures in relation to the three equations. Other leveling systems typically leave the final degree of freedom uncontrolled and only control the spring lengths. However, large amounts of cross-loading can be present, even if the three equations are satisfied (e.g., the front left and rear right springs have high pressures, while the front right and rear left springs have low pressures). This can lead to asymmetric vehicle dynamics and have undesirable effects.

The final degree of freedom can be controlled by suspension controller 820 using spring pressure ratios or other criteria that minimize cross-loading. For example, the pressure constraint $$\frac{P_{FL}+P_{FR}}{P_{RL}+P_{RR}}=\frac{P_{FL}}{P_{RL}}=\frac{P_{FR}}{P_{RR}}$$

can be used, where $P_{FL}$, $P_{FR}$, $P_{RL}$, and $P_{RR}$ are the front left, front right, rear left and rear right spring pressures, respectively. Such a constraint ensures minimized cross-loading by preserving the front to rear pressure ratios on both the left and right sides. Any number of similar constraints may be used to control the degree of freedom. For example, the constraint $$\frac{P_{FL}+P_{RL}}{P_{FR}+P_{RR}}=\frac{P_{FL}}{P_{FR}}=\frac{P_{RL}}{P_{RR}}$$

is functionally equivalent to the previous constraint and also reduces cross-loading.

A pressure constraint provides a fourth equation for the suspension system and allows suspension controller 820 to calculate the four target pressures (e.g., to solve for $P_{FL}$, $P_{FR}$, $P_{RL}$, and $P_{RR}$). This provides target pressures that correspond to "ideal" conditions, i.e., vehicle 800 is at a desired height, vehicle 800 is on a level surface, no frictional loads exist, and cross-loading is minimal.

Figure 10A:
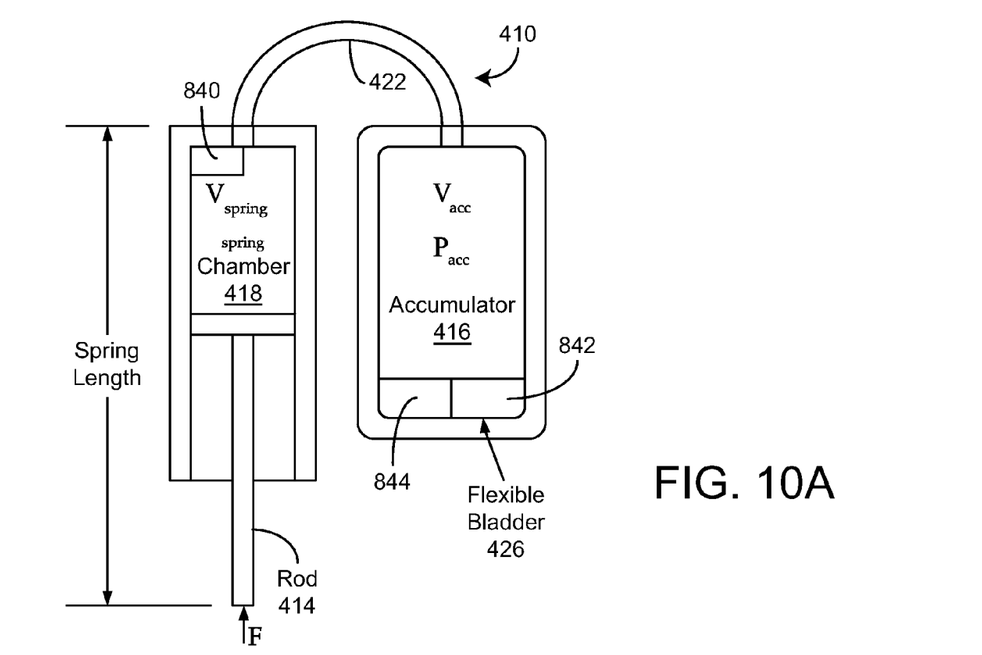
FIGS. 10A-B are detailed diagrams of a gas spring assembly, according to an exemplary embodiment.
Figure 10B:
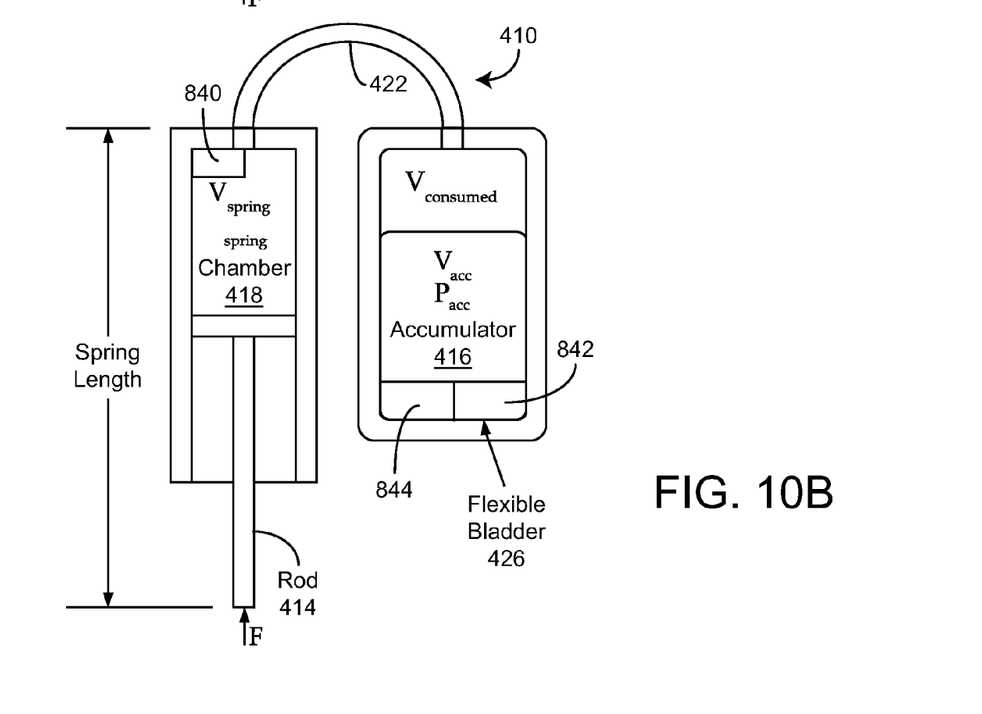

Referring now to FIGS. 10A and 10B, detailed diagrams of spring assembly 410 are shown, according to an exemplary embodiment. Spring assembly 410 is shown both where accumulator 416 has not been compressed (FIG. 10A) and has been compressed (FIG. 10B).

In addition to the pressure values, suspension controller 820 can also calculate the volumes $V_{current}$ and $V_{target}$. $V_{target}$ corresponds to the "ideal" conditions for vehicle 800 and can be calculated using the internal geometry of the spring assembly under these conditions. For example, the target volume may be calculated by multiplying the spring length by the cross-sectional area of chamber 418. In another example, the target volume may be calculated using the geometry of spring chamber 418, the geometry of accumulator 416, and/or the geometry of flexible bladder 426 at the target ride height. In some embodiments, $V_{target}$ is a fixed value and stored in the memory of suspension controller 820. In other embodiments, $V_{target}$ may be one or more values that account for different desired heights or non-ideal conditions.

In FIG. 10A, accumulator 416 has not been compressed, meaning that the pressure in accumulator 416 is greater than the pressure in spring chamber 418 (e.g., $P_{acc} > P_{spring}$). This also means that the total volume (e.g., $V_{tot}$) of the accumulator gas comprises the gas within flexible bladder 426 (e.g., $V_{acc}$). In this case, the geometry of spring chamber 418 can be used to calculate the current volume $V_{current}$ (e.g., using the cross-sectional area of chamber 418, the spring length, etc.). In one embodiment, suspension controller 820 can use measurements from spring length sensor 850 and preset values for the other dimensions of chamber 418 to determine the current gas volume. For example, suspension controller 820 may include a lookup table that relates spring length values to spring volumes. In another example, suspension controller 820 may perform the volume calculation by multiplying a cross-sectional area of spring chamber 418 by a length value.

Suspension controller 820 can calculate the current volume using spring pressure data received from spring pressure sensor 840 and using accumulator pressure data received from accumulator pressure sensor 842. If the accumulator pressure is greater than the spring pressure, accumulator 416 is uncompressed and suspension controller 820 can calculate the current gas volume using the geometry of the spring. If the accumulator pressure is not greater than the spring pressure, then accumulator 416 is likely compressed. In one embodiment, suspension controller 820 does not provide a height adjustment to the suspension system of vehicle 800 until accumulator 416 returns to an uncompressed state.

In FIG. 10B, accumulator 416 is shown to be compressed, meaning that the total volume of the gas in accumulator 416 comprises both the volume of the gas in flexible bladder 426 (e.g., $V_{acc}$) and the volume of the additional gas consumed by accumulator 416 (e.g., $V_{consumed}$). In this case, the geometry of spring chamber 418 cannot be used alone to calculate the current volume.

In one embodiment, suspension controller 820 is configured to adjust the height of vehicle 800 when accumulator 416 is in a compressed state. Using data received from temperature sensor 844, which measures the temperature in accumulator 416, the current volume can be estimated. Suspension controller 820 can estimate the current volume using the ideal gas law, PV=nRT, where P is the pressure, V is the volume, n is the amount of gas, R is the universal gas constant approximately equal to 8.314 J/(K*mol), and T is the measured temperature in Kelvin. Rearranging the equation yields $$nR = \frac{P_{acc} * V_{acc}}{T_{acc}},$$

where $P_{acc}$ is the accumulator pressure measured by sensor 842, $V_{acc}$ is the volume of gas in bladder 426, and $T_{acc}$ is the accumulator temperature measured by temperature sensor 844. When $P_{acc} > P_{spring}$, $V_{acc}$ is known based on the geometry of accumulator 416 and suspension controller 820 may use this equation to calculate n*R and store a history of these values in memory. Suspension controller 820 can then use an average of historical values for n*R from periods in which the accumulator pressure is greater than the spring pressure as an estimate for n*R. An average value helps to reduce the effects of noise in the pressure and temperature readings. In an alternate embodiment, raw data values may be used to calculate n*R.

Suspension controller 820 can use the estimated value of n*R to calculate the current accumulator volume $V_{acc}$ using the equation $$V_{acc} = \frac{nR * T_{acc}}{P_{acc}}$$

where $T_{acc}$ is the current temperature measured by temperature sensor 844 and $P_{acc}$ is P the current sensor accumulator pressure measured by accumulator pressure sensor 842. Suspension controller 820 can then estimate the consumed volume of gas in accumulator 416 using $V_{consumed} = V_{tot} - V_{acc}$ where $V_{tot}$ is the total volume of accumulator 416. For example, $V_{tot}$ may be a stored value and based on the overall geometry of accumulator 416. Suspension controller 820 can then estimate the current volume of the spring $V_{current}$ by adding $V_{consumed}$ to $V_{spring}$, where $V_{spring}$ is calculated using the current geometry of the spring.

Figure 11:
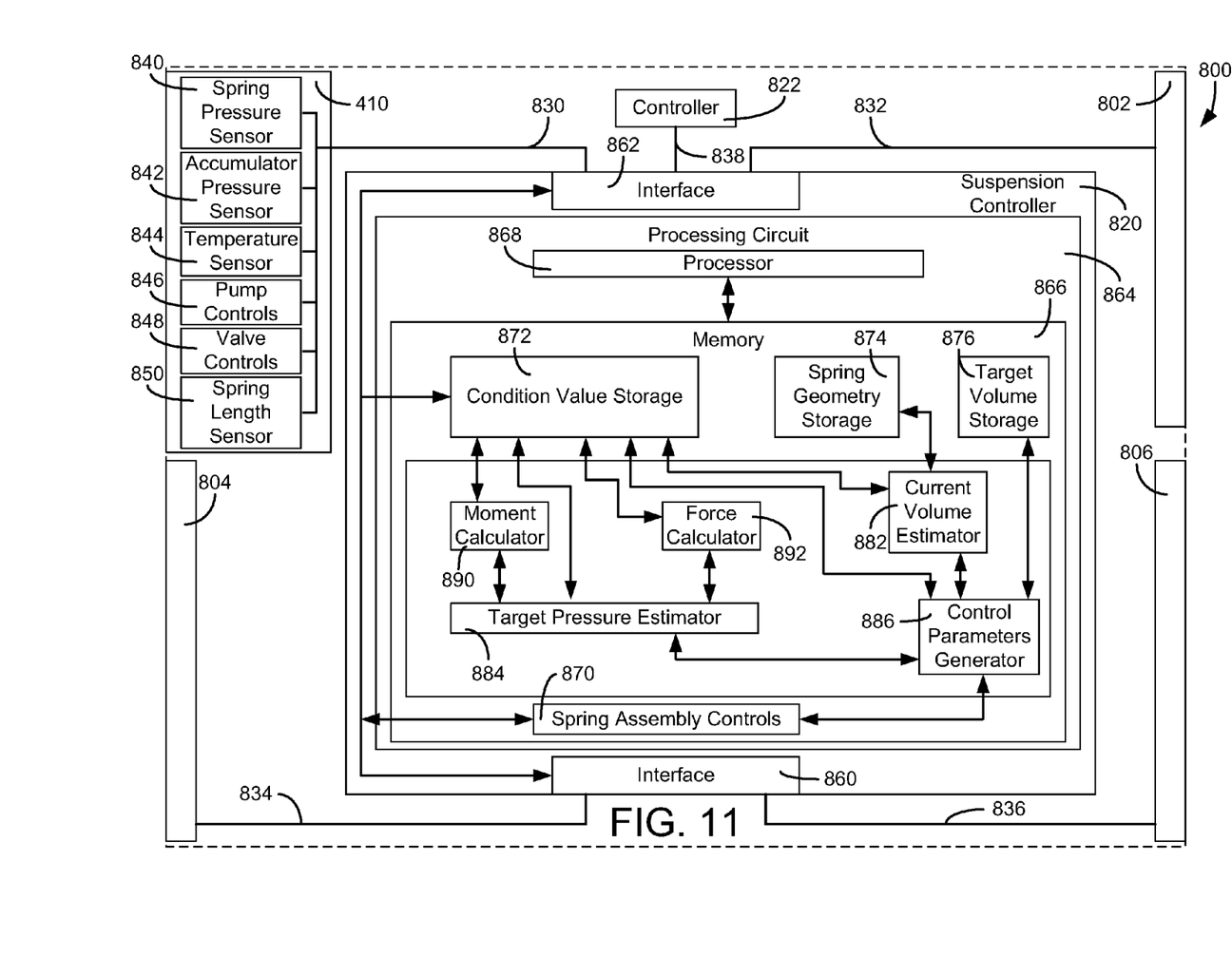
FIG. 11 is a detailed diagram of the vehicle suspension control system of FIG. 8, according to an exemplary embodiment.

Referring now to FIG. 11, a more detailed diagram of the vehicle suspension system of FIG. 8 is shown, according to an exemplary embodiment. Suspension controller 820 is shown to include interfaces 860 and 862 which comprise data communications electronics to communicate with spring assemblies 410, 802, 804, 806 and controller 822 via data lines 830, 832, 834, 836, and 838, respectively. In some embodiments, interfaces 860 and 862 may be combined as a single communications circuitry capable of communicating via data lines 830, 832, 834, 836, and 838. In other embodiments, interfaces 860, 862 may comprise multiple communications circuits to communicate with the suspension sensors and controls in vehicle 800. For example, interface 860 may comprise a communications circuit to wirelessly communicate with spring pressure sensor 840 and a communications circuit to communicate with pump controls 846 over a wired connection.

Suspension controller 820 includes processing circuit 864 which includes processor 868 and memory device 866. Processor 868 can be implemented as a general purpose processor, an application specific integrated circuit (ASIC), one or more field programmable gate arrays (FPGAs), a group of processing components, or other suitable electronic processing components. Memory device 866 (e.g., memory, memory unit, storage device, etc.) is one or more devices (e.g., RAM, ROM, Flash memory, hard disk storage, etc.) for storing data and/or computer code for completing and/or facilitating the various processes, layers and modules described in the present application. Memory device 866 may be or include volatile memory or non-volatile memory. Memory device 866 may include database components, object code components, script components, or any other type of information structure for supporting the various activities and information structures described in the present application. According to an exemplary embodiment, memory device 866 is communicably connected to processor 868 via processing circuit 864 and includes computer code for executing (e.g., by processing circuit 864 and/or processor 868) one or more processes described herein.

Measured data from the vehicle suspension system (e.g., data received from spring pressure sensor 840, accumulator pressure sensor 842, temperature sensor 844, etc.) are received by suspension controller 820 via interfaces 860, 862 and stored in condition value storage 872. Condition value storage 872 stores data values relating to the overall condition of the suspension system (e.g., measured values, estimated values, average values, etc.). Condition value storage 872 may also store both current and historical values relating to the condition of the suspension system. For example, suspension controller 820 may receive measured temperature data from temperature sensor 844 and store a history of temperature values in condition value storage 872 to compute an average value for n*R for use when estimating $V_{current}$.

Suspension controller 820 is also shown to include spring geometry storage 874, which stores values associated with the geometry of spring assemblies 410, 802, 804, and 806. In some embodiments, spring geometry storage 874 comprises a lookup table that relates measured spring length values to spring volumes. Spring geometry storage 874 may also store geometry information relating to the accumulators of spring assemblies 410, 802, 804, and 806.

Suspension controller 820 is further shown to include target volume storage 876. Target volume storage 876 stores spring volume data that corresponds to one or more target spring volumes. In some embodiments, target spring volume data is provided to suspension controller 820 by a user interface in communication with controller 822. In other embodiments, the target spring volume data is calculated by suspension controller 820 using measured spring length data received from spring length sensors (e.g., spring length sensor 850, etc.).

Suspension controller 820 also includes moment calculator 890 and force calculator 892. Moment calculator 890 receives measured values from condition value storage 872 and calculates moments of inertia about the x and y axes, as shown in FIG. 9. Force calculator 892 receives measured values from condition value storage 872 and calculates force values in the z-axis direction, as shown in FIG. 9.

Suspension controller 820 also includes target pressure estimator 884. Target pressure estimator 884 receives calculated moments of inertia from moment calculator 890 and calculated force values from force calculator 892. Target pressure estimator 884 calculates target pressure values such that multiple constraints are met. In one embodiment, target pressure estimator 884 utilizes four constraints. First, all forces in the z-axis should cancel, i.e., $\Sigma F_z = 0$, where $F_z$ denotes force values provided by force calculator 892. Second, the x-axis moments must be equal, i.e., $\Sigma M_x = 0$, where $M_x$ are the corresponding moments about the x-axis provided by moment calculator 890. Third, the y-axis moments must be equal, i.e., $\Sigma M_y = 0$, where $M_y$ are the corresponding moments about the y-axis provided by moment calculator 890. Finally, target pressure estimator 884 utilizes a constraint based on a ratio of spring pressures. For example, constraint $$\frac{P_{FL} + P_{FR}}{R_{RL} + P_{RR}} = \frac{P_{FL}}{P_{RL}} = \frac{P_{FR}}{P_{RR}}$$

or constraint $$\frac{P_{FL} + P_{RL}}{P_{FR} + P_{RR}} = \frac{P_{FL}}{P_{FR}} = \frac{P_{RL}}{P_{RR}}$$

may be used, where $P_{FL}$, $P_{FR}$, $P_{RL}$, and $P_{RR}$ are the front left, front right, rear left and rear right spring pressures, respectively. The target pressures are then provided by target pressure estimator 884 to control parameters generator 886.

In an alternate embodiment, moment calculator 890, force calculator 892 and target pressure estimator 884 are omitted and one or more target pressure values are provided to suspension controller 820 during a configuration period and stored within memory 866. For example, a user may provide one or more target pressure values to suspension controller 820 via controller 822.

Suspension controller 820 further includes current volume estimator 882. Current volume estimator 882 estimates a current volume of the spring gas, i.e., $V_{spring}$. Current volume estimator 882 receives measured spring pressure data and measured accumulator pressure data from condition value storage 872. Current volume estimator 882 is configured to compare the measured spring pressure data and the measured accumulator pressure data. If the accumulator pressure is greater than the spring pressure, current volume estimator 882 uses spring geometry data received from spring geometry storage 874 and measured spring length data from condition value storage 874 to calculate the current volume of spring gas (e.g., by multiplying a cross-sectional area of the spring by a spring length, etc.). Current volume estimator 882 then provides the estimated current volume data to control parameter generator 886.

In one embodiment, current volume estimator 882 receives measured temperature and pressure data from condition value storage 872 and calculates n*R using the equation $$nR = \frac{P_{acc} * V_{tot}}{T_{acc}},$$

where $P_{acc}$ is the measured accumulator pressure, $V_{tot}$ is the total volume of the accumulator, and $T_{acc}$ is the measured accumulator temperature. A history of n*R values may be stored by current volume estimator 882 in condition value storage 872. Current volume estimator 882 may also calculate an average of calculated values for n*R and store it in condition value storage 872 for use when the accumulator pressure is not greater than the spring pressure.

If current volume estimator 882 determines that the accumulator pressure data is not greater than the spring pressure data, then the accumulator is compressed. In one embodiment, current volume estimator 882 provides an indication to control parameter generator 886 to prevent adjustment of the suspension system until the accumulator is not compressed. In another embodiment, current volume estimator 882 receives measured temperature and pressure data, as well as an average value for n*R, from condition value storage 872. Current volume estimator also receives geometry data from spring geometry storage 874 relating to the total volume of the accumulator, i.e., $V_{tot}$. Current volume estimator 882 calculates the current accumulator volume $V_{acc}$ using the equation $$V_{acc} = \frac{nR * T_{acc}}{P_{acc}}$$

where $T_{acc}$ is the current measured temperature in the accumulator, $P_{acc}$ is the current measured accumulator pressure, and n*R is the average of a history of calculated values for n*R. Current volume estimator 882 uses the accumulator volume $V_{acc}$ to calculate a consumed volume value, $V_{consumed}$ using the equation $V_{consumed} = V_{tot} - V_{acc}$ where $V_{tot}$ is the total volume of the accumulator. Current volume estimator 882 also calculates a spring volume using geometric data from spring geometry storage 874 and measured spring length data from condition value storage 872 (e.g., current volume estimator 882 multiplies a length value by a cross-sectional area value). Current volume estimator 882 then adds the calculated spring volume to $V_{consumed}$ to generate a current volume value and provides the current volume value to control parameter generator 886.

Control parameters generator 886 provides one or more control parameters to the pump and valve controls in the suspension system (e.g., pump control 846, valve control 848, etc.) via interfaces 860, 862. Control parameters generator 886 receives target pressure values from target pressure estimator 884, target volume values from target volume storage 876, current pressure values from condition value storage 872, and estimated current volumes from current volume estimator 882. Control parameters generator 886 also calculates a difference between the current values and the target values. For example, control parameter generator 886 may calculate an error using error=$[P*V]_{current} - P_{target}*V_{target}$, where P and V are the current spring pressure and volumes and $P_{target}$ and $V_{target}$ are target pressure and volumes. Control parameters generator 886 adjusts the suspension system of vehicle 800 by generating one or more control parameters that reduce the calculated difference. For example, control parameters generator 886 may send a control parameter to the pump controls in spring assembly 802 to increase the pressure in its spring.

Figure 12:
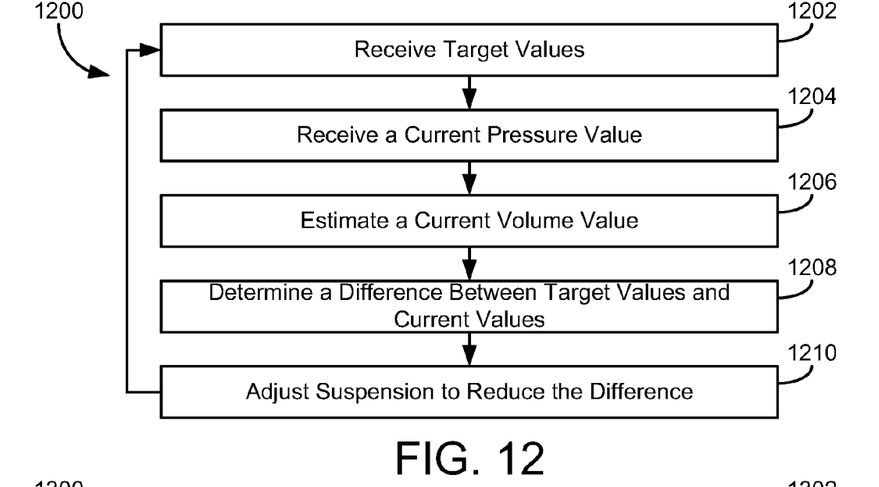
FIG. 12 is a flow diagram of a method for controlling a vehicle suspension system, according to an exemplary embodiment.

Referring now to FIG. 12, a flow diagram of method 1200 for controlling a vehicle suspension system is shown, according to an exemplary embodiment. Method 1200 is shown to include receiving target values (step 1202). Target values may be gas pressure and/or volume values that correspond to a desired height for a vehicle suspension system. For example, the target values may correspond to spring pressure and gas volume values under "ideal" conditions, i.e., when a vehicle is at a desired height, the vehicle is on a level surface, no frictional loads exist, and cross-loading is minimal. Method 1200 also includes receiving a current pressure value (step 1204). For example, the current pressure value may be measured by a pressure sensor within a gas spring.

Method 1200 further includes estimating a current volume value (step 1206). If the accumulator is not compressed, the current volume value may be estimated using geometric values corresponding to the dimensions of the gas spring. If the accumulator is compressed, the current volume value may be estimated by adding a volume value calculated using the dimensions of the spring to an accumulator consumption volume calculated using a measured temperature value within the accumulator.

Method 1200 yet further includes determining a difference between the target values and the current values (step 1208). In one embodiment, the product of the target values is subtracted from the product of the current values. For example, the difference may be an error estimation calculated as error=$[P*V]_{current} - P_{target}*V_{target}$ where P and V are the current spring pressure and volume and $P_{target}$ and $V_{target}$ are the target pressure and volume values for a given gas spring.

Method 1200 also includes adjusting the suspension of the vehicle to reduce the difference value (step 1210). For example, the suspension of the vehicle may be adjusted by providing one or more control parameters to pump controllers and/or valve controllers in a gas spring assembly to alter the current pressure and/or volume in the spring.

Figure 13:
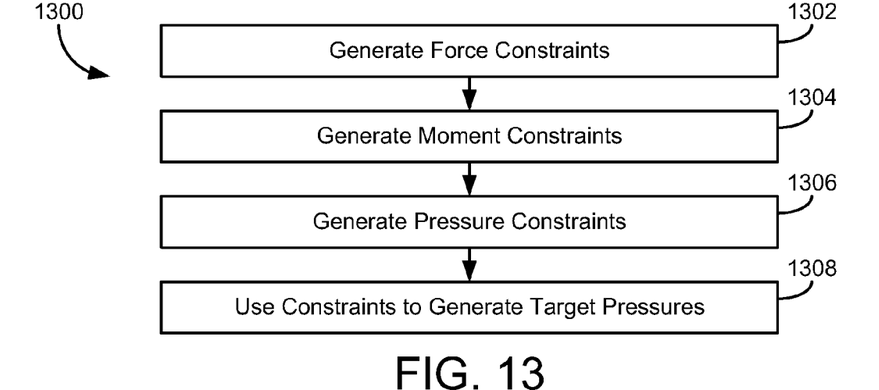
FIG. 13 is a flow diagram of a method for generating a target pressure for a gas spring, according to an exemplary embodiment.

Referring now to FIG. 13, a flow diagram of a method 1300 for generating a target pressure for a gas spring is shown, according to an exemplary embodiment. Method 1300 includes generating force constraints (step 1302). In one embodiment, the force constraints require that the forces along the z-axis for the vehicle cancel, i.e., that $\Sigma F_z=0$. In other embodiments, the sum of the forces may be non-zero for a non-idealized condition. For example, it may be desirable to utilize a non-zero sum constraint if the vehicle is not on a level surface, frictional loads exist, and cross-loading is not minimal, etc. or any other undesirable condition.

Method 1300 also includes generating moment constraints (step 1304). In one embodiment, the x-axis moments of inertia must cancel, i.e., that $\Sigma M_x=0$, where $M_x$ are the corresponding moments about the x-axis. A similar constraint may also be placed on the y-axis moments, i.e., that $\Sigma M_y=0$, where $M_y$ are the corresponding moments about the y-axis. In other embodiments, the sum of the x-axis and y-axis moments may be nonzero to accommodate non-ideal conditions.

Method 1300 further includes generating pressure constraints (step 1306). In one embodiment, the pressure constraints are chosen to minimize cross-loading in the vehicle. For example, a ratio of spring pressures may be used as the pressure constraints, such as $$\frac{P_{FL} + P_{FR}}{P_{RL} + P_{RR}} = \frac{P_{FL}}{P_{RL}} = \frac{P_{FR}}{P_{RR}},$$

where $P_{FL}$, $P_{FR}$, $P_{RL}$, and $P_{RR}$ are the front left, front right, rear left and rear right spring pressures, respectively. In another example, the pressure constraint may be $$\frac{P_{FL} + P_{RL}}{P_{FR} + P_{RR}} = \frac{P_{FL}}{P_{FR}} = \frac{P_{RL}}{P_{RR}}.$$

Method 1300 is finally shown to include using the force, moment, and pressure constraints to generate target spring pressures (step 1308). For example, the pressures used in the pressure constraints from step 1306 are solved for using the force and moment constraints. In other embodiments, any number of force, moment, and pressure constraints may be used to generate the target pressures. For example, a vehicle having three axles (e.g., six spring assemblies) would require six constraints to solve for the respective target pressures.

Figure 14:
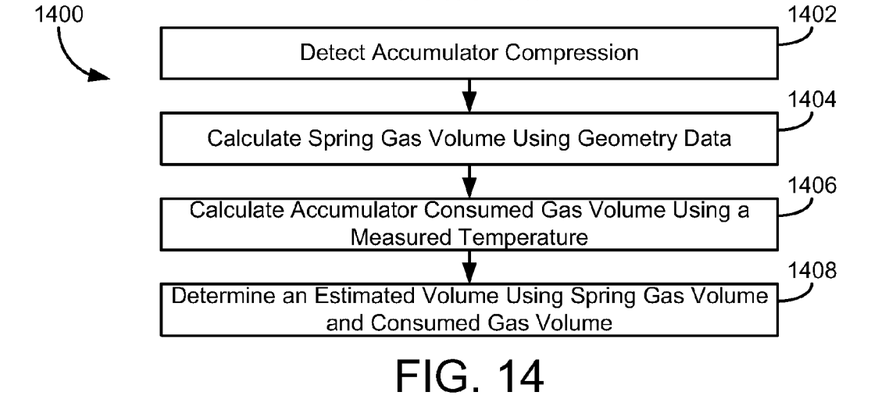
FIG. 14 is a flow diagram of a method for determining an estimated volume for a gas spring, according to an exemplary embodiment.

Referring now to FIG. 14, method 1400 for estimating a gas volume is shown, according to an exemplary embodiment. Method 1400 is shown to include detecting accumulator compression (step 1402). Accumulator compression may be detected by comparing measured pressures in a gas spring chamber and in an accumulator. If the accumulator pressure is not greater than the spring pressure, the accumulator is compressed. Otherwise, the accumulator is compressed.

Method 1400 is also shown to include calculating a spring gas volume using geometry data (step 1404). For example, a spring gas volume may be calculated by multiplying a cross-sectional area of a spring and a measured length value. In other words, the spring gas volume corresponds to the physical volume of the spring chamber itself.

Method 1400 is further shown to include calculating the gas volume consumed by the accumulator using a measured temperature. In cases where the accumulator bladder is compressed (e.g., the accumulator is in a compressed state), a consumed gas volume may exist within the accumulator. In one embodiment, a measured accumulator temperature may be used to compute $$nR = \frac{P_{acc} * V_{acc}}{T_{acc}},$$

where $P_{acc}$ is a measured accumulator, $V_{acc}$ is the volume of gas in the accumulator bladder, and $T_{acc}$ is the measured accumulator temperature. When $P_{acc} > P_{spring}$, $V_{acc}$ is equal to $V_{tot}$ (i.e., is equal to the volume of the accumulator) and the equation can be solved for n*R. In some embodiments, an average of n*R values is taken to reduce the effects of noise. In other embodiments, a raw computation of n*R is made. The value for n*R can be used to calculate the current accumulator volume $V_{acc}$ using the equation $$V_{acc} = \frac{nR * T_{acc}}{P_{acc}}$$

where $T_{acc}$ is the current temperature measured by temperature sensor 844 and $P_{acc}$ is the current measured accumulator pressure. The consumed gas volume can then be calculated using $V_{consumed} = V_{tot} - V_{acc}$, where $V_{tot}$ is the total volume of the accumulator. For example, $V_{tot}$ may be a stored value and based on the overall geometry of the accumulator.

Method 1400 is yet further shown to include determining an estimated volume using a spring gas volume and a consumed gas volume (step 1408). For example, the values calculated in steps 1404 and 1406 may be added to determine the estimated volume.

The construction and arrangement of the systems and methods as shown in the various exemplary embodiments are illustrative only. Although only a few embodiments have been described in detail in this application, many modifications are possible. For example, the position of elements may be varied and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present application.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for adjusting a suspension system for a vehicle, the suspension system having one or more gas springs, comprising:
   a processing circuit configured to receive a measure of gas in the one or more springs; wherein the processing circuit is further configured to calculate a difference between a target value and a current value based on the received measure of gas;
   wherein the processing circuit is configured to provide an output for adjusting the gas in the one or more springs in response to the calculated difference;
   wherein the processing circuit is further configured to determine a target pressure value for the one or more springs and a volume estimation for the one or more springs, the processing circuit determining the target pressure value using a ratio of spring pressures; and
   wherein the processing circuit is further configured to calculate the difference using the target pressure value and the volume estimation.

2. The controller of claim 1, wherein the measure of gas is a measured pressure value.

3. The controller of claim 1, wherein the processing circuit is further configured to determine if an accumulator is compressed; and wherein the processing circuit determines the volume estimation using the geometry of the one or more springs if the accumulator is determined to not be compressed.

4. The controller of claim 1, wherein the processing circuit determines the volume estimation by adding accumulator volume data to spring volume data.

5. The controller of claim 1, wherein the processing circuit is further configured to receive temperature data from the suspension system; and wherein the processing circuit determines the volume estimation using the temperature data.

6. A method for adjusting the suspension system of a vehicle comprising:
   receiving at a processing circuit a measured pressure value from a pressure sensor in a gas spring assembly;
   determining a target pressure value using a constraint comprising a ratio of pressure values;
   determining in a memory a difference value using the measured pressure value and the target pressure value; and
   adjusting the gas spring assembly to reduce the difference value.

7. The method of claim 6, further comprising:
   receiving at the processing circuit a measured temperature value from a temperature sensor in the gas spring assembly;

calculating in the memory an estimated volume value using the measured temperature value; and wherein the difference value is determined using the measured pressure value, the target pressure value, and the estimated volume value.

8. The method of claim 7, further comprising:

storing a target volume value in the memory; and wherein the difference value is determined using the target volume value.

9. The method of claim 8, wherein the estimated volume value is calculated using one or more dimensions of a gas spring chamber.

10. The method of claim 6, further comprising:

determining if the gas spring assembly is at a travel range limit; and adjusting the gas spring assembly if the gas spring assembly is at a travel range limit.

11. The method of claim 6, further comprising:

determining whether an accumulator in the spring assembly is compressed; and calculating in the memory an estimated volume value using one or more dimensions of a gas spring in the gas spring assembly; and wherein the difference value is determined using the measured pressure value, the target pressure value, and the estimated volume value.

12. A vehicle suspension system comprising:

a gas spring;

a spring pressure sensor configured to measure the pressure in the gas spring;

a spring length sensor configured to determine a length of the gas spring; and a processing circuit configured to receive a current spring pressure value from the spring pressure sensor and to receive a current spring length value from the spring length sensor;

wherein the processing circuit is further configured to calculate a current volume value using the spring length sensor, to determine the product of the current volume value and the current spring pressure value, and to calculate a difference value using a target value and the product;

wherein the target value comprises the product of a target pressure value and a target volume value;

wherein the target pressure value is determined using a constraint comprising a ratio of pressure values; and wherein the processing circuit is further configured to provide an output for adjusting the amount of gas in the spring in response to the calculated difference.

13. The suspension system of claim 12, further comprising:

an accumulator operably connected to the gas spring;

an accumulator pressure sensor configured to measure the pressure in the accumulator; and wherein the processing circuit is further configured to receive a current accumulator pressure value from the accumulator pressure sensor and to determine whether the accumulator pressure value is greater than the current spring pressure value.

14. The suspension system of claim 13, further comprising:

a temperature sensor configured to measure the temperature in the accumulator; and wherein the processing circuit is further configured to receive a temperature value from the temperature sensor; and wherein the current volume value is further calculated using the temperature value in response to determining that the accumulator pressure value is not greater than the current spring pressure value.

15. The suspension system of claim 12, wherein the ratio of pressure values minimize cross loading.

* * * * *